(12) United States Patent
Bai

(10) Patent No.: US 10,554,244 B2
(45) Date of Patent: Feb. 4, 2020

(54) MULTIWAY SWITCH, RADIO FREQUENCY SYSTEM, AND WIRELESS COMMUNICATION DEVICE

(71) Applicant: Guangdong Oppo Mobile Telecommunications Corp., Ltd., Dongguan, Guangdong (CN)

(72) Inventor: Jian Bai, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/173,501

(22) Filed: Oct. 29, 2018

(65) Prior Publication Data

US 2019/0288736 A1 Sep. 19, 2019

(30) Foreign Application Priority Data

Mar. 16, 2018 (CN) .................. 2018 1 02207118

(51) Int. Cl.
*H04B 7/00* (2006.01)
*H04B 1/401* (2015.01)
(Continued)

(52) U.S. Cl.
CPC .............. *H04B 1/401* (2013.01); *H04B 1/006* (2013.01); *H04B 1/44* (2013.01); *H04B 1/48* (2013.01);
(Continued)

(58) Field of Classification Search
CPC .. G06F 3/033; H01P 1/10; H03H 7/46; H04B 1/00; H04B 1/28; H04B 1/38; H04B 1/40;
(Continued)

(56) References Cited

U.S. PATENT DOCUMENTS 6,229,486 B1  5/2001 Krile
7,633,357 B2 * 12/2009 Hangai .................. H01P 1/15
                                                        333/103
(Continued)

FOREIGN PATENT DOCUMENTS

CN      101154978 A      4/2008
CN      101242213 A      8/2008
(Continued)

OTHER PUBLICATIONS

International search report issued in corresponding international application No. PCT/CN2018111028 dated Jan. 3, 2019.
(Continued)

*Primary Examiner* — Shawkat M Ali
(74) *Attorney, Agent, or Firm* — Young Basile Hanlon & MacFarlane, P.C.

(57) ABSTRACT

A multiway switch, a radio frequency system, and a wireless communication device are provided. The multiway switch includes eight T ports and four P ports. The eight T ports includes four first T ports and each of the four first T ports is coupled with all of the four P ports. The four first T ports support a transmission-reception function. The multiway switch is configured to be coupled with a radio frequency circuit and an antenna system of an electronic device to implement a preset function of the electronic device. The antenna system includes four antennas corresponding to the four P ports. The preset function is a function of transmitting a sounding reference signal (SRS) through the four antennas in turn.

19 Claims, 13 Drawing Sheets

(51) Int. Cl.
*H04B 1/00* (2006.01)
*H04B 1/48* (2006.01)
*H04B 7/0413* (2017.01)
*H04B 7/06* (2006.01)
*H04L 25/02* (2006.01)
*H04Q 3/00* (2006.01)
*H04B 1/44* (2006.01)

(52) U.S. Cl.
CPC ......... *H04B 7/0413* (2013.01); *H04B 7/0602* (2013.01); *H04L 25/0228* (2013.01); *H04Q 3/00* (2013.01); *H04Q 3/0004* (2013.01); *H04Q 2213/1302* (2013.01)

(58) Field of Classification Search
CPC . H04B 1/44; H04B 1/48; H04B 1/006; H04B 1/401; H04B 1/403; H04B 7/08; H04B 7/108; H04B 7/185; H04B 7/0413; H04B 7/0602; H04B 7/18582; H04B 7/18584; H04L 5/14; H04L 25/0228; H04W 36/00; H04W 36/34; H04W 36/0027; H04W 40/16; H04W 52/52; H04W 72/12; H04W 88/02; H04W 88/06
USPC ......... 333/101, 103; 370/281; 375/219, 260, 375/262, 267, 295, 316; 455/73, 83, 455/552.1, 557
See application file for complete search history.

(56) References Cited

U.S. PATENT DOCUMENTS

| | | | |
|---|---|---|---|
| 9,831,940 B2* | 11/2017 | Patel | H04B 7/18584 |
| 2009/0054093 A1 | 2/2009 | Kim et al. | |
| 2013/0308554 A1 | 11/2013 | Ngai et al. | |
| 2014/0227982 A1 | 8/2014 | Granger-Jones et al. | |
| 2017/0149134 A1 | 5/2017 | Klemes | |
| 2017/0195004 A1 | 7/2017 | Cheng et al. | |
| 2017/0373368 A1* | 12/2017 | Srirattana | H01P 5/18 |
| 2018/0152955 A1* | 5/2018 | Park | H04W 36/0027 |
| 2018/0205413 A1* | 7/2018 | Patel | H03F 3/195 |

FOREIGN PATENT DOCUMENTS

| | | |
|---|---|---|
| CN | 101867402 A | 10/2010 |
| CN | 202103661 U | 1/2012 |
| CN | 103905104 A | 7/2014 |
| CN | 105245295 A | 1/2016 |
| CN | 105281735 A | 1/2016 |
| CN | 105634569 A | 6/2016 |
| CN | 106559277 A | 4/2017 |
| CN | 106685621 A | 5/2017 |
| CN | 106788577 A | 5/2017 |
| CN | 108199727 A | 6/2018 |
| CN | 108199729 A | 6/2018 |
| CN | 108390693 A | 8/2018 |
| CN | 108462497 A | 8/2018 |
| CN | 108462506 A | 8/2018 |
| CN | 108494413 A | 9/2018 |
| CN | 108494461 A | 9/2018 |
| CN | 108599777 A | 9/2018 |
| WO | 2012026601 A1 | 3/2012 |
| WO | 2015131020 A1 | 9/2015 |

OTHER PUBLICATIONS

Extended European search report issued in corresponding European application No. 18203601.2 dated May 28, 2019.

Gao Xiang et al: "Multi-Switch for Antenna Selection in Massive MIMO" 2015 IEEE Global Communications Conference (GLOBECOM), IEEE, Dec. 6, 2015 (Dec. 6, 2015), pp. 1-6, XPQ32872922, DOI: 10.1109/GLOCOM.2014.7417765; abstract; Sections I, III.B, III.C; figures 1, 2, 5, 6.

Lemieux G et al: "Generating Highly-Routable Sparse Crossbars for PLDS" FPGA'00. ACM/SIGDA International Symposium on Field Programmable Gate Arrays. Monterey, CA, Feb. 9-11, 20; [ACM/SIGDA International Symposium on Field Programmable Gate Arrays], New York, NY: ACM, US, vol. : Conf. 8, Jan. 1, 2000 (Jan. 1, 2000), pp. 155-164, XP008O6O160, DOI: 10.1145/329166.329199; ISBN: 978-1-58113-193-2; Section 2; figure 1.

International search report issued in corresponding international application No. PCT/CN2018/112763 dated Jan. 30, 2019.

* cited by examiner

MULTIWAY SWITCH, RADIO FREQUENCY SYSTEM, AND WIRELESS COMMUNICATION DEVICE

CROSS-REFERENCE TO RELATED APPLICATION(S)

This application claims priority to Chinese Patent Application No. 201810220711.8, filed on Mar. 16, 2018, the entire disclosure of which is hereby incorporated by reference.

TECHNICAL FIELD

This disclosure relates to the field of mobile terminal technology, and particularly to a multiway switch, a radio frequency system, and a wireless communication device.

BACKGROUND

With the widespread use of electronic devices such as smart phones, the smart phone can support an increasing number of applications and is becoming more and more powerful. The smart phone is developing in a diversified and personalized way, becoming indispensable electronic products in users' life. In the fourth generation (4G) mobile communication system, the electronic device generally adopts a single-antenna or dual-antenna radio frequency (RF) system architecture. Currently, in a new radio (NR) system of the fifth generation (5G) mobile communication system, requirements on supporting a four-antenna RF system architecture are proposed.

SUMMARY

Implementations of the disclosure provide a multiway switch, a radio frequency system, and a wireless communication device, to implement a function of transmitting a sounding reference signal (SRS) through four antennas corresponding to four ports in turn (that is, four-port SRS) of an electronic device in the fifth generation new radio (5G NR).

According to a first aspect of implementations of the disclosure, a multiway switch is provided. The multiway switch includes eight T ports and four P ports. The eight T ports includes four first T ports and each of the four first T ports is coupled with all of the four P ports. The four first T ports support a transmission-reception function.

The multiway switch is configured to be coupled with a radio frequency circuit and an antenna system of an electronic device operable in a dual-frequency dual-transmit mode, to implement a preset function of the electronic device. The antenna system includes four antennas corresponding to the four P ports. The preset function is a function of transmitting an SRS through the four antennas in turn.

According to a second aspect of implementations of the disclosure, a radio frequency system is provided. The radio frequency system includes an antenna system, a radio frequency circuit, and a multiway switch coupled with the radio frequency circuit and the antenna system. The multiway switch includes eight T ports and four P ports. The eight T ports includes four first T ports and each of the four first T ports is coupled with all of the four P ports. The four first T ports support a transmission-reception function. The antenna system includes four antennas corresponding to the four P ports. The multiway switch is configured to implement a preset function of transmitting an SRS through the four antennas in turn.

According to a third aspect of implementations of the disclosure, a wireless communication device is provided. The wireless communication device includes an antenna system, a radio frequency transceiver, a radio frequency circuit coupled with the radio frequency transceiver, and a multiway switch coupled with the radio frequency circuit and the antenna system.

The multiway switch includes eight T ports and four P ports. The antenna system includes four antennas corresponding to the four P ports. The eight T ports include four first T ports and four second T ports. Each of the four first T ports is coupled with all of the four P ports. The four first T ports support a transmission-reception function. Two of the four second T ports at different frequency bands are coupled with one of the four P ports. The other two of the four second T ports at different frequency bands are coupled with another one of the four P ports. The four second T ports support only a reception function. Each of the four P ports is configured to be coupled with a corresponding antenna of the four antennas. The multiway switch is configured to support a preset function of transmitting an SRS through the four antennas in turn.

BRIEF DESCRIPTION OF THE DRAWINGS

To describe technical solutions in implementations of the present disclosure or in the related art more clearly, the following briefly introduces the accompanying drawings required for describing the implementations or the related art. Apparently, the accompanying drawings in the following description only illustrate some implementations of the present disclosure. Those of ordinary skill in the art may also obtain other drawings based on these accompanying drawings without creative efforts.

DETAILED DESCRIPTION

Figure 1:
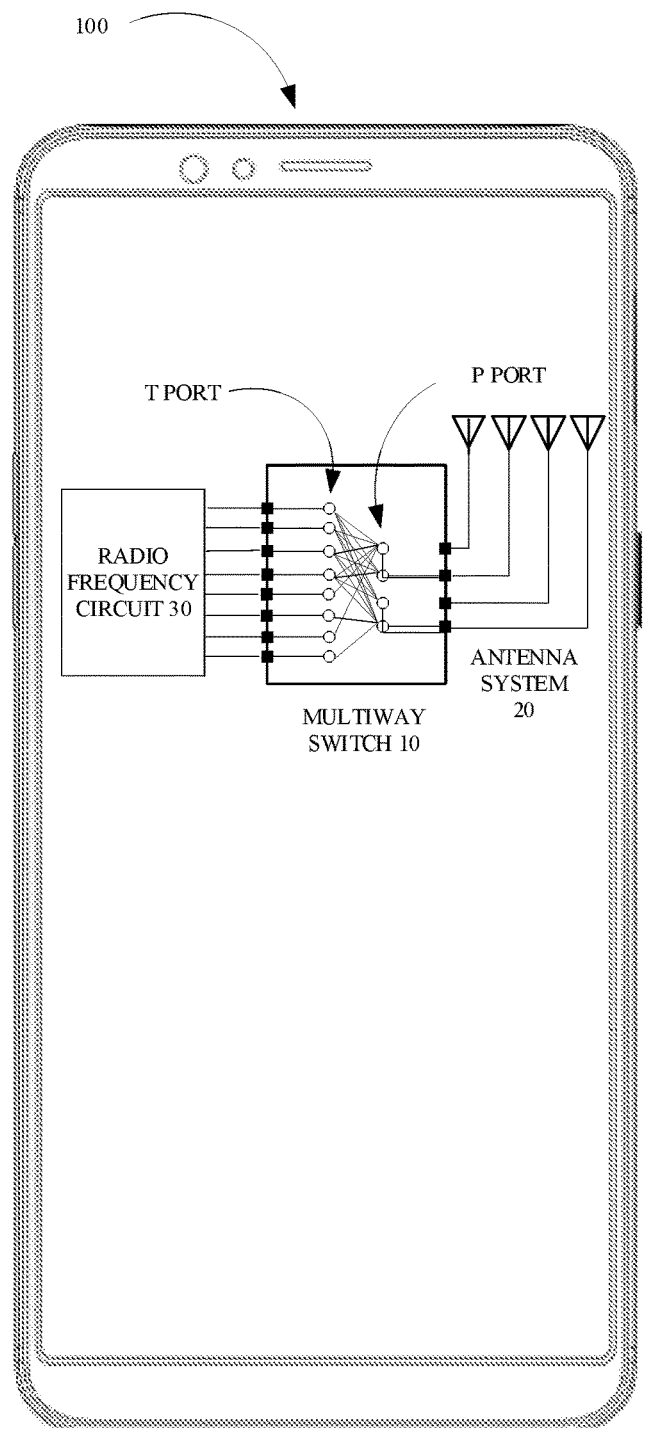
FIG. 1 is a schematic structural diagram illustrating a multiway switch according to an implementation of the disclosure.

Technical solutions in implementations of the present disclosure will be described clearly and completely hereinafter with reference to the accompanying drawings described in the previous chapter. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "first", "second", "third", "fourth", and the like used in the specification, the claims, and the accompanying drawings of the present disclosure are to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units. Instead, it can optionally include other steps or units that are not listed; alternatively, other steps or units inherent to the process, method, product, or device can also be included.

The term "embodiment" or "implementation" referred to herein means that a particular feature, structure, or characteristic described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

The wireless communication device involved in the implementations of the present disclosure may include terminal devices, base stations, and servers that have wireless communication functions. The wireless communication device may include at least one of handheld devices, in-vehicle devices, wearable devices (such as smart bracelets, smart watches, wearable glasses, wireless headsets), wireless charging receivers, computing devices or other processing devices connected to the wireless modem, as well as various forms of user equipments (UE), mobile stations (MS), terminal devices, and the like. For the convenience of description, the above-mentioned devices are collectively referred to as a wireless communication device.

In order to better understand the multiway switch and the electronic device of the implementations of the present disclosure, the following will describe the implementations of the present disclosure in detail.

At present, SRS transmission via four antennas switching of a mobile phone is a mandatory option for China mobile communications corporation (CMCC) in the China mobile fifth generation (5G) Scale Test Technical White Paper_Terminal, which is optional in the 3rd generation partnership project (3GPP). Its main purpose is for a base station to determine quality and parameters of four channels via measuring uplink signals of the four antennas of the mobile phone, to perform a beamforming of a downlink massive multi-input multi-output (MIMO) antenna array on the four channels according to a channel reciprocity, and finally to obtain the best data transmission performance for a downlink 4×4 MIMO.

In order to satisfy requirements of SRS transmission via four antennas switching, implementations of the present disclosure provide a radio frequency architecture based on a simplified 4P8T (four P ports and eight T ports) antenna switch. Compared with a related 3P3T/DPDT/multiway small switch switching scheme, the present switching scheme can reduce the number of series switches in each path (all or part of switches are integrated into the 4P8T switch), thereby reducing link loss and optimizing the overall transmission and reception performance of the terminal.

The following describes some terms of the disclosure to facilitate understanding of those skilled in the art.

"P port" in the disclosure is the abbreviation of "pole port", which refers to ports coupled with antennas of the multiway switch. "T port" in the disclosure is the abbreviation of "throw port", which refers to ports coupled with radio frequency modules of the multiway switch. For example, a 4P4T switch refers to a switch that has four P ports coupled with antennas and four T ports coupled with a radio frequency circuit. "Module" herein can refer to circuits and any combination of related components.

The concept of coupling, full coupling, or other kinds of coupling between the T ports and the P ports of the multiway switch described in the implementations of the disclosure refers to a state in which the T ports are coupled with the P ports through first switch transistors. One T port or one P port may be one port of a second switch transistor. The first switch transistors are configured to control a unidirectional conduction state between the T ports and the P ports (including a unidirectional conduction state from the T ports to the P ports and a unidirectional conduction state from the P ports to the T ports). The first switch transistor can be, for example, a switch array including three metal-oxide-semiconductor (MOS) transistors. When the first switch transistor is disconnected and not grounded, parasitic parameters will greatly affect performance of other connected ports. Therefore, the first switch transistor is implemented with three MOS transistors, where the three MOS transistors can be in a common source connection, that is, coupled at a common source. When the first switch transistor is disconnected, two MOS transistors at two ends are disconnected and one MOS transistor in the middle is grounded. The second switch transistor is configured to enable a corresponding port (T port or P port) and can be, for example, a MOS transistor. The specific configurations of the first switch transistor and the second switch transistor are not limited herein. As one implementation, the electronic device can control paths between the T ports and the P ports to switch on through the first switch transistors. As one implementation, the electronic device can be provided with a dedicated controller to be coupled with switch transistors of the multiway switch.

The transmitting a sounding reference signal (SRS) through the four antennas corresponding to the four P ports in turn refers to a process in which the electronic device interacts with a base station based on polling mechanism to determine quality of an uplink channel corresponding to each antenna.

The implementations of the present disclosure are described in detail below.

FIG. 1 is a schematic structural diagram illustrating a multiway switch 10 according to an implementation of the disclosure. The multiway switch 10 includes eight T ports and four P ports. Four T ports of the eight T ports are coupled with all of the four P ports (that is, fully-coupled). Two T ports at different frequency bands of the remaining four T ports are coupled with one of the four P ports, and the other two T ports at different frequency bands of the remaining four T ports are coupled with another one of the four P ports. The multiway switch 10 is applicable to a wireless communication device. The wireless communication device can be an electronic device 100 illustrated in FIG. 1. The electronic device 100 is operable in a dual-frequency dual-transmit mode and includes an antenna system 20 and a radio frequency circuit 30. The antenna system 20 includes four antennas. The four antennas correspond to the four P ports; specifically, the four antennas and the four P ports are in one-to-one correspondence.

The multiway switch 10 is configured to be coupled with the radio frequency circuit 30 and the antenna system 20 to implement a preset function of the electronic device 100. The preset function is a function of transmitting an SRS through the four antennas corresponding to the four P ports in turn, which can be understood as a four-port SRS function.

The electronic device may be a mobile phone or other terminal devices supporting the fifth generation new radio (5G NR), such as a customer premise equipment (CPE) or a mobile wireless-fidelity (MIFI).

The dual-frequency dual-transmit mode refers to an operating mode in which the electronic device 100 can support at most dual frequency band-two UL transmit paths or dual frequency band-four DL receive paths.

The multiway switch 10 includes field-effect transistors (FET). As four T ports of the eight T ports are fully coupled with the four P ports and the other four T ports of the eight T ports are only configured to be coupled with one fixed antenna for receiving, the number of built-in FETs, volume, and cost of the 4P8T switch can be reduced and performance can be improved. Details will be described hereinafter.

Figure 2:
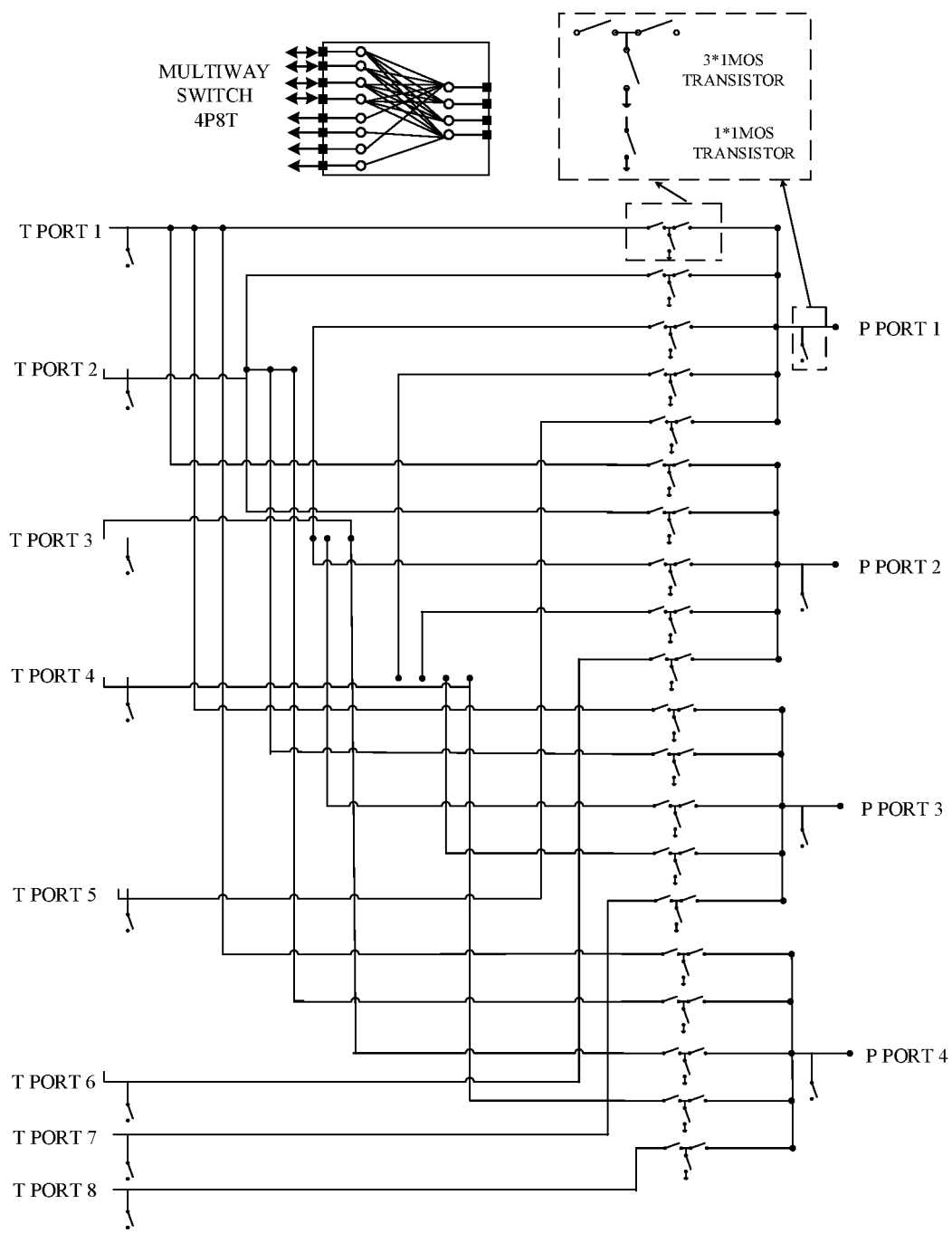
FIG. 2 is a schematic structural diagram illustrating a simplified 4P8T switch according to an implementation of the disclosure.

For example, in the case that the electronic device is operable in the dual-frequency dual-transmit mode, among the eight T ports, if each T port is fully coupled with the four P ports, the number of the field-effect transistors of the multiway switch 10 is 8+8*4*3+4=108; if four T ports are fully coupled with the four P ports, as illustrated in FIG. 2 of a schematic structural diagram of the multiway switch 10, the number of the field-effect transistors of the multiway switch 10 is 8+(4*4+(8−4)*1)*3+4=72.

By limiting the number of T ports that are fully coupled with the four P ports (in other words, fully coupled T ports), the number of switches of a radio frequency system of the electronic device can be effectively reduced. That is to say, the number of fully coupled T ports has a great influence on performance of the radio frequency system.

In addition, the electronic device 100 further includes a radio frequency transceiver. The radio frequency transceiver is coupled with the radio frequency circuit 30 and constitutes a radio frequency system of the electronic device 100 together with the radio frequency circuit 30, the multiway switch 10, and the antenna system 20.

According to the implementations of the disclosure, the multiway switch 10 is provided, which is applicable to the electronic device 100. The electronic device 100 is operable in the dual-frequency dual-transmit mode and includes the antenna system 20, the radio frequency circuit 30, and the multiway switch 10. The antenna system 20 includes the four antennas. The multiway switch 10 includes the eight T ports and the four P ports. Four T ports of the eight T ports are fully coupled with the four P ports. The multiway switch 10 is configured to be coupled with the radio frequency circuit 30 and the antenna system 20 to implement the preset function of the electronic device 100, and the preset function is a function of transmitting an SRS through the four antennas corresponding to the four P ports in turn.

As one implementation, the eight T ports include four first T ports and four second T ports. Each of the four first T ports is fully coupled with the four P ports. Two of the four second T ports at different frequency bands are coupled with one of the four P ports, and the other two of the four second T ports at different frequency bands are coupled with another one of the four P ports. Each of the four P ports is configured to be coupled with a corresponding antenna of the four antennas. The four first T ports support a transmission-reception function and the four second T ports support only a reception function.

In this implementation, since the multiway switch 10 includes the first T ports and the second T ports and the number of the second T ports is not 0, in comparison with a configuration in which all T ports are fully coupled with P ports, for the multiway switch 10 provided herein, the number of switches is reduced. That is, the number of the switches in transmit paths and/or receive paths of the radio frequency system of the electronic device 100 can be reduced, thereby reducing path loss, improving transmit power/sensitivity, data transmission rate in the 5G NR, and uplink and downlink coverage of the mobile phone, and reducing power consumption and cost.

In the case that the electronic device 100 is operable in the dual-frequency dual-transmit mode, the electronic device 100 logically includes eight receiver circuits (can be comprehended as a circuit for receiving and/or processing signals) and four transmitter circuits (can be comprehended as a circuit for transmitting and/or processing signals). Since the multiway switch 10 includes eight T ports and the eight T ports include four first T ports, the number of the field-effect transistors of the multiway switch is 8+(4*4+(8−4)*1)*3+4=72. One of the four transmitter circuits and one of the eight receiver circuits are integrated into one transceiver integrated circuit (can be comprehended as an integrated circuit for transmitting, receiving, and/or processing signals) through a switch, another one of the four transmitter circuits and another one of the eight receiver circuits are integrated into another one transceiver integrated circuit through a switch, yet another one of the four transmitter circuits and yet another one of the eight receiver circuits are integrated into yet another one transceiver integrated circuit through a switch, and still another one of the four transmitter circuits and still another one of the eight receiver circuits are integrated into still another one transceiver integrated circuit through a switch. That is to say, there are four transceiver integrated circuits in total that are distributed to at most four independent circuit modules. Each transceiver integrated circuit is coupled with a first port of an independent circuit module to which this transceiver integrated circuit belongs. Since the four transmitter circuits and the four of the eight receiver circuits are integrated into the four transceiver integrated circuits, the remaining four receiver circuits are disposed individually. The remaining four receiver circuits can belong to one independent circuit module or an independent circuit module to which a transceiver integrated circuit belongs. The independent circuit module(s) to which the four receiver circuits belong is not limited herein. In the case that the remaining four receiver circuits belong to one independent circuit module, the remaining four receiver circuits are coupled with four second ports of the independent circuit module (in one-to-one correspondence). In the case that the independent circuit modules to which the four transceiver integrated circuits and the remaining four receiver circuits belong are not limited, the radio frequency circuit 30 can be illustrated in FIGS. 3A, 4, 5, 6, 7, 8, 9, and 10.

The specific configuration of the transmitter circuit and the receiver circuit, and definitions related to the multiway switch 10 are similar to the foregoing implementations and will not be described herein again. In addition, it can be understood that, the matching manner of the above radio frequency circuit 30 and the multiway switch 10 includes but is not limited to the structure of the drawing, and is merely an example herein.

The multiway switch 10 of the implementation of the disclosure can enable the electronic device 100 to be operable in the dual-frequency dual-transmit mode. It is beneficial to simplifying the RF architecture of the electronic device supporting four-port SRS switching in the 5G NR, reducing the number of switches in transmit paths and receive paths, and reducing path loss, thereby improving transmit power/sensitivity, data transmission rate in the 5G NR, and uplink and downlink coverage of the mobile phone, and reducing power consumption.

Figure 3A:
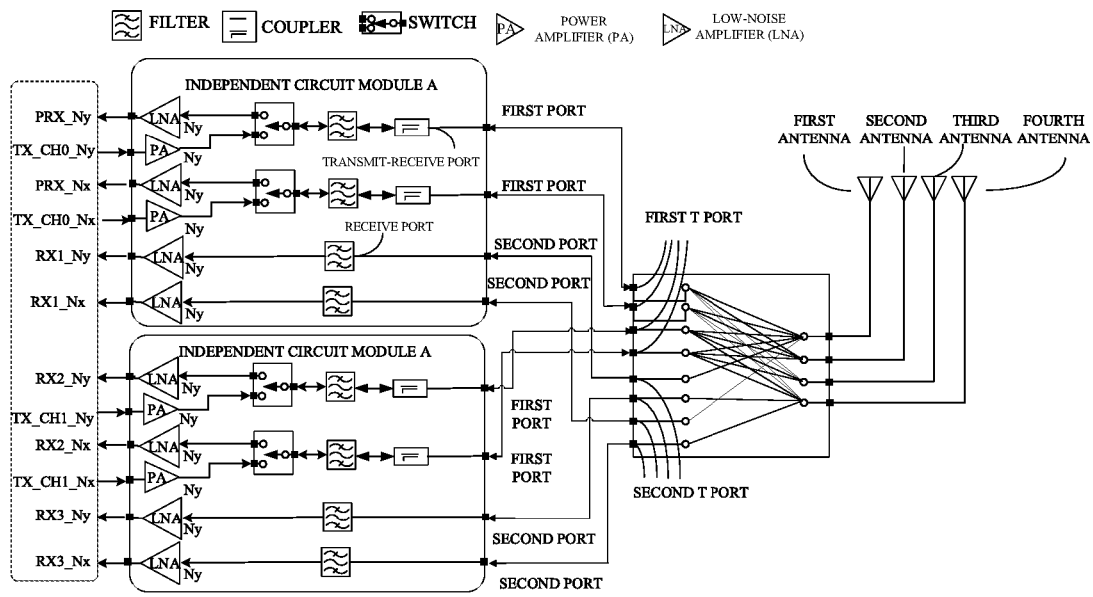
FIG. 3A is a schematic structural diagram illustrating a radio frequency circuit of an electronic device according to an implementation of the disclosure.

In one implementation, as illustrated in FIG. 3A of the schematic structural diagram of the electronic device 100, the radio frequency circuit 30 physically includes two independent circuit modules. The two independent circuit modules include two first independent circuit modules, where the first independent circuit module is embodied as an independent circuit module A. The independent circuit module A includes two first ports and two second ports. Each first port is coupled with one of the four first T ports, and each second port is coupled with one of the four second T ports. The independent circuit module A includes two transceiver integrated circuits and two receiver circuits. The two transceiver integrated circuits work at different frequency bands. Each transceiver integrated circuit includes one transmitter circuit and one receiver circuit and has a transmit-receive port coupled with one first port of the independent circuit module A. Each receiver circuit has a receive port coupled with one second port of the independent circuit module A. Details will be described hereinafter.

Figure 4:
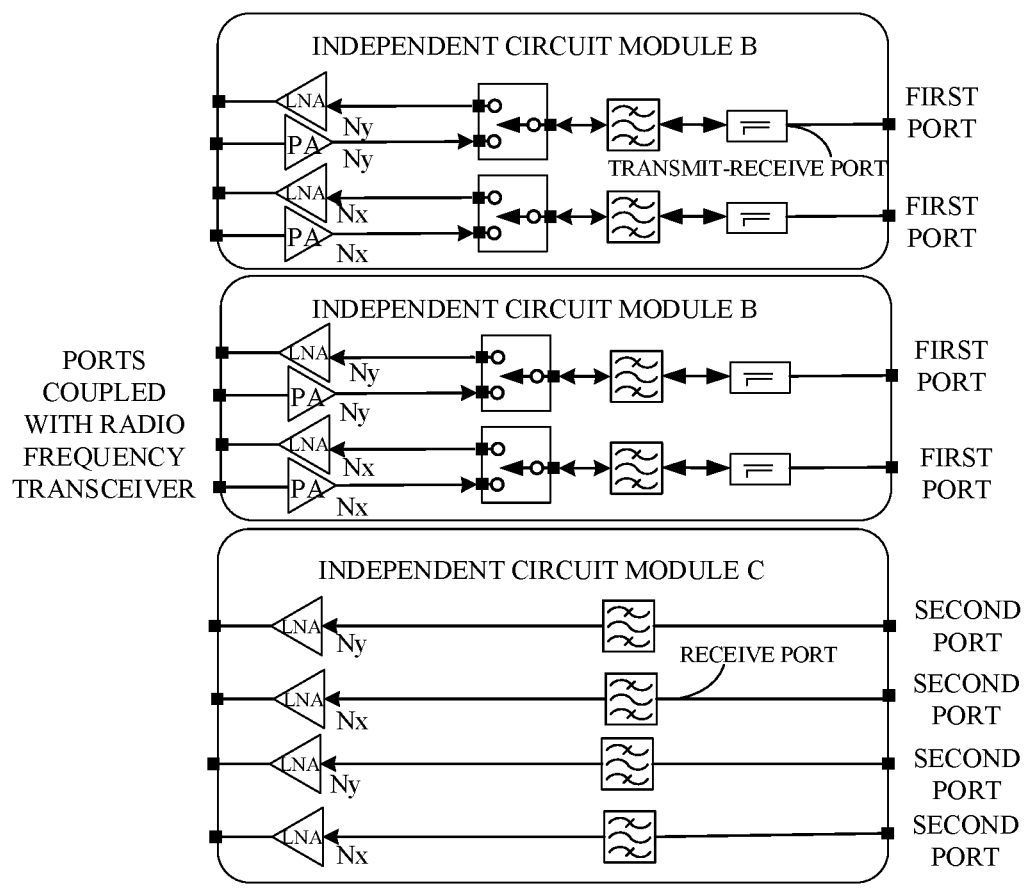
FIG. 4 is a schematic structural diagram illustrating another radio frequency circuit according to an implementation of the disclosure.

In one implementation, as illustrated in FIG. 4 of the schematic structural diagram of the electronic device 100, the radio frequency circuit 30 physically includes three independent circuit modules. The three independent circuit modules include two first independent circuit modules and one second independent circuit module. In this implementation, the first independent circuit module is embodied as an independent circuit module B and the second independent circuit module is embodied as an independent circuit module C. The independent circuit module B includes two first ports, and the independent circuit module C includes four second ports. Each first port is coupled with one of the four first T ports, and each second port is coupled with one of the four second T ports. The independent circuit module B includes two transceiver integrated circuits. The two transceiver integrated circuits work at different frequency bands. Each transceiver integrated circuit includes one transmitter circuit and one receiver circuit and has a transmit-receive port coupled with one first port of the independent circuit module B. The independent circuit module C includes four receiver circuits. Each receiver circuit has a receive port coupled with one second port of the independent circuit module C. Details will be described hereinafter.

Figure 5:
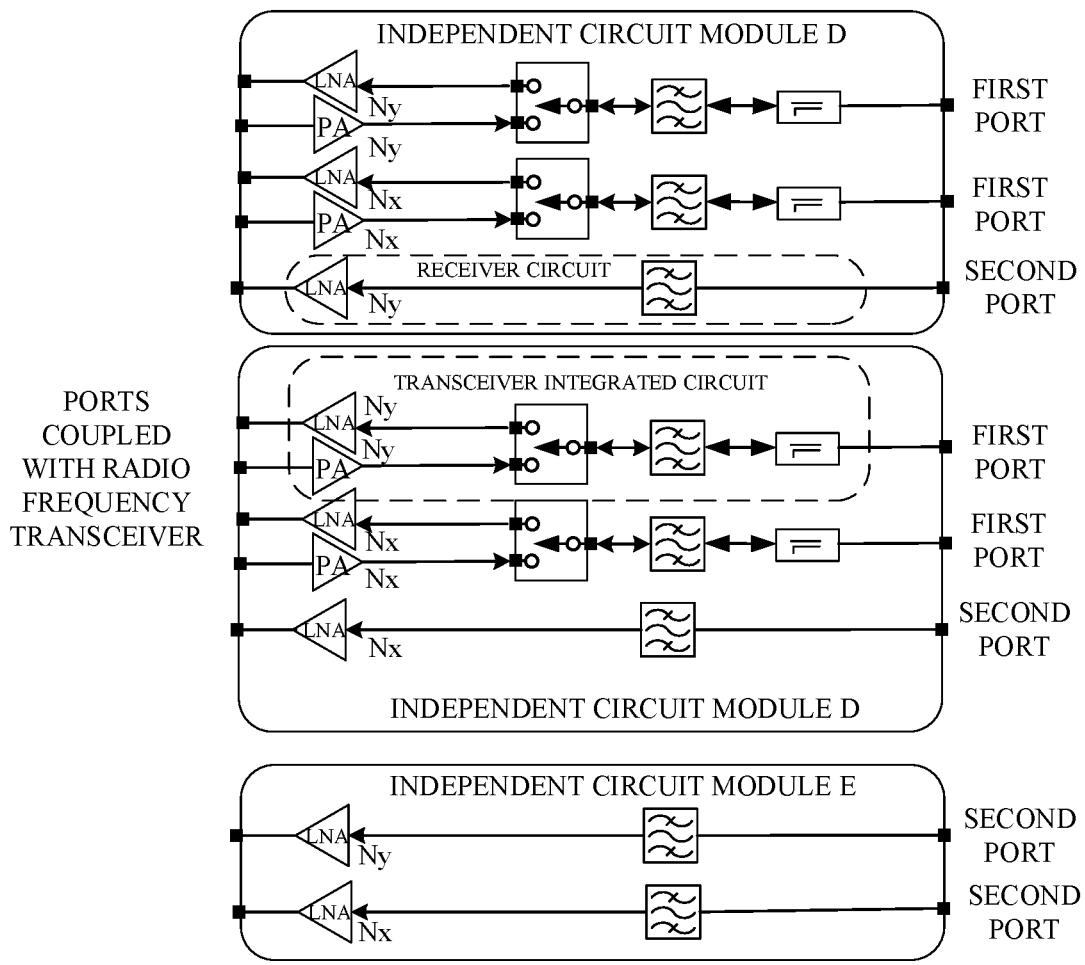
FIG. 5 is a schematic structural diagram illustrating yet another radio frequency circuit according to an implementation of the disclosure.

In one implementation, as illustrated in FIG. 5 of the schematic structural diagram of the electronic device 100, the radio frequency circuit 30 physically includes three independent circuit modules. The three independent circuit modules include two first independent circuit modules and one second independent circuit module. In this implementation, the first independent circuit module is embodied as an independent circuit module D and the second independent circuit module is embodied as an independent circuit module E. The independent circuit module D includes two first ports and one second port, and the independent circuit module E includes two second ports. Each first port is coupled with one of the four first T ports, and each second port is coupled with one of the four second T ports. The independent circuit module D includes two transceiver integrated circuits and one receiver circuit. The two transceiver integrated circuits work at different frequency bands. Each transceiver integrated circuit includes one transmitter circuit and one receiver circuit and has a transmit-receive port coupled with one first port of the independent circuit module D. The receiver circuit has a receive port coupled with the second port of the independent circuit module D. The independent circuit module E includes two receiver circuits. Each receiver circuit has a receive port coupled with one second port of the independent circuit module E. Details will be described hereinafter.

Figure 6:
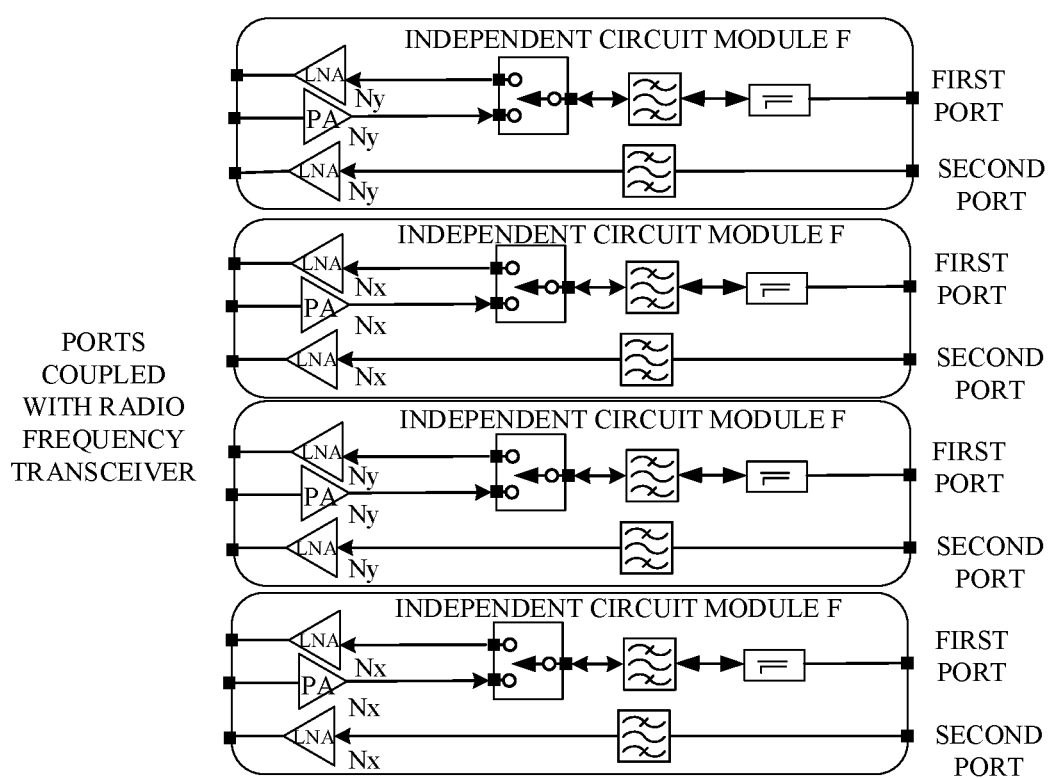
FIG. 6 is a schematic structural diagram illustrating still another radio frequency circuit according to an implementation of the disclosure.

In one implementation, as illustrated in FIG. 6 of the schematic structural diagram of the electronic device 100, the radio frequency circuit 30 physically includes four independent circuit modules. The four independent circuit modules include four first independent circuit modules, where the first independent circuit module is embodied as an independent circuit module F. The independent circuit module F includes one first port and one second port. Each first port is coupled with one of the four first T ports, and each second port is coupled with one of the four second T ports. The independent circuit module F includes one transceiver integrated circuit and one receiver circuit. The transceiver integrated circuit includes one transmitter circuit and one receiver circuit and has a transmit-receive port coupled with the first port of the independent circuit module F. The receiver circuit module has a receive port coupled with the second port of the independent circuit module F. Details will be described hereinafter.

Figure 7:
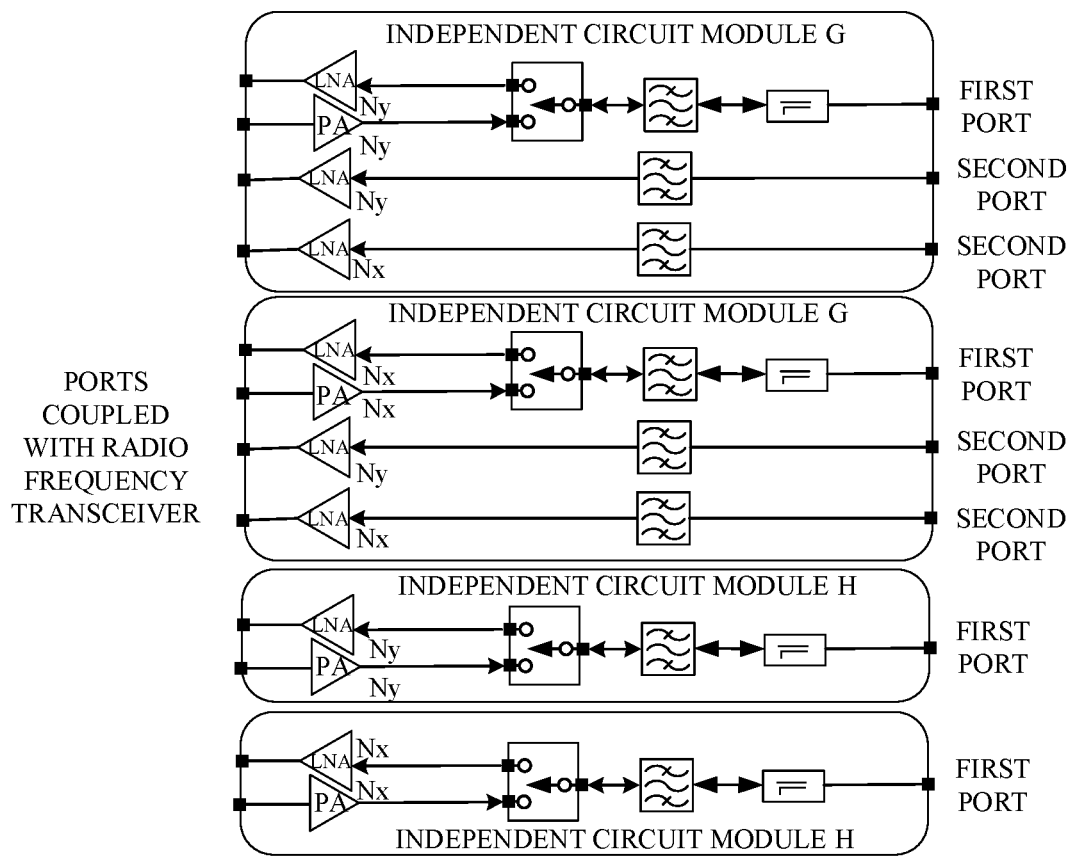
FIG. 7 is a schematic structural diagram illustrating still another radio frequency circuit according to an implementation of the disclosure.

In one implementation, as illustrated in FIG. 7 of the schematic structural diagram of the electronic device 100, the radio frequency circuit 30 physically includes four independent circuit modules. The four independent circuit modules include two first independent circuit modules and two second independent circuit modules. In this implementation, the first independent circuit module is embodied as an independent circuit module G and the second independent circuit module is embodied as an independent circuit module H. The independent circuit module G includes one first port and two second ports and the independent circuit module H includes one first port. Each first port is coupled with one of the four first T ports, and each second port is coupled with one of the four second T ports. The independent circuit module G includes one transceiver integrated circuit and two receiver circuits. The transceiver integrated circuit includes one transmitter circuit and one receiver circuit and has a transmit-receive port coupled with the first port of the independent circuit module G. Each receiver circuit has a receive port coupled with one second port of the independent circuit module G. The independent circuit module H includes one transceiver integrated circuit. The transceiver integrated circuit includes one transmitter circuit and one receiver circuit and has a transmit-receive port coupled with the first port of the independent circuit module H. Details will be described hereinafter.

Figure 8:
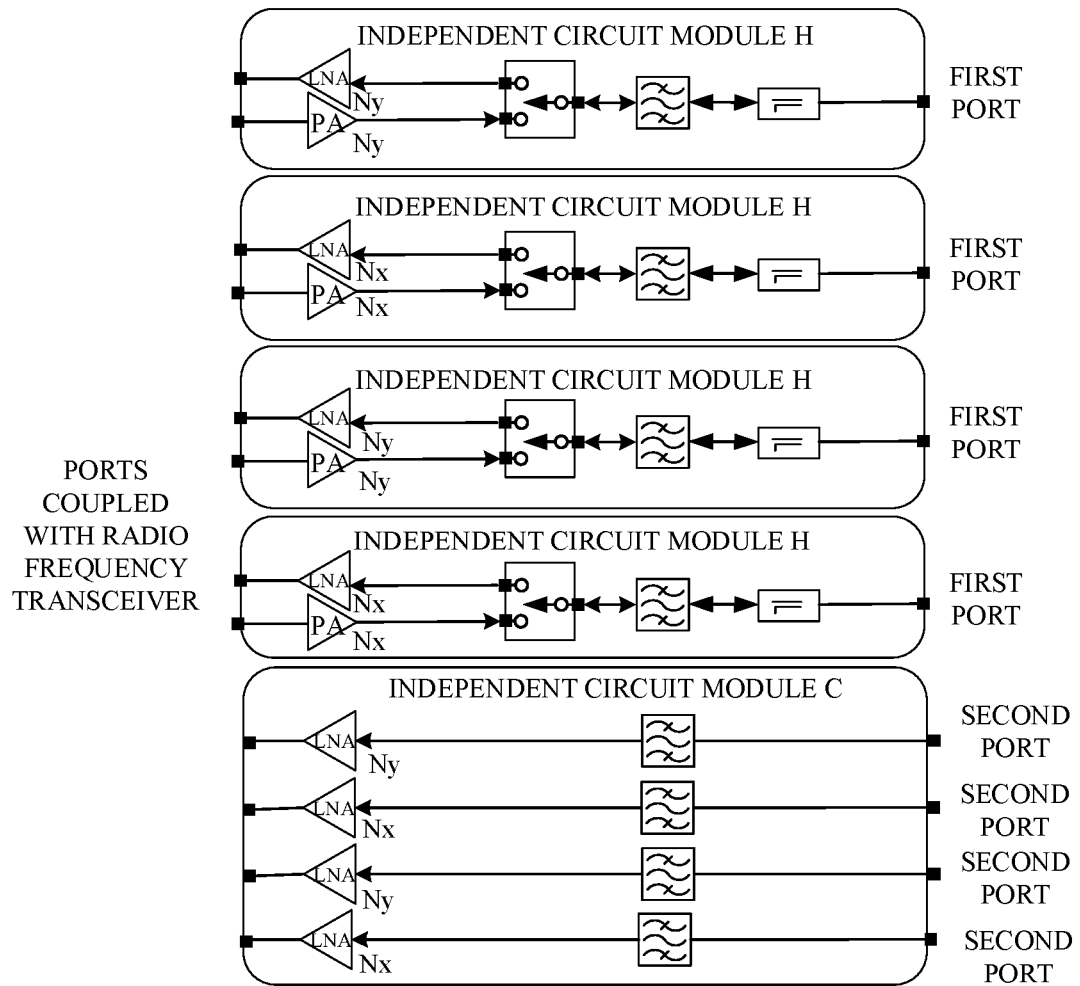
FIG. 8 is a schematic structural diagram illustrating still another radio frequency circuit according to an implementation of the disclosure.

In one implementation, as illustrated in FIG. 8 of the schematic structural diagram of the electronic device 100, the radio frequency circuit 30 physically includes five independent circuit modules. The five independent circuit modules include one first independent circuit module and four second independent circuit modules. In this implementation, the first independent circuit module is embodied as an independent circuit module C and the second independent circuit module is embodied as an independent circuit module H. The independent circuit module C includes four second ports, and the independent circuit module H includes one first port. Each first port is coupled with one of the four first T ports, and each second port is coupled with one of the four second T ports. The independent circuit module C includes four receiver circuits. Each receiver circuit has a receive port coupled with one second port of the independent circuit module C. The independent circuit module H includes one transceiver integrated circuit. The transceiver integrated circuit includes one transmitter circuit and one receiver circuit and has a transmit-receive port coupled with the first port of the independent circuit module H. Details will be described hereinafter.

Figure 9:
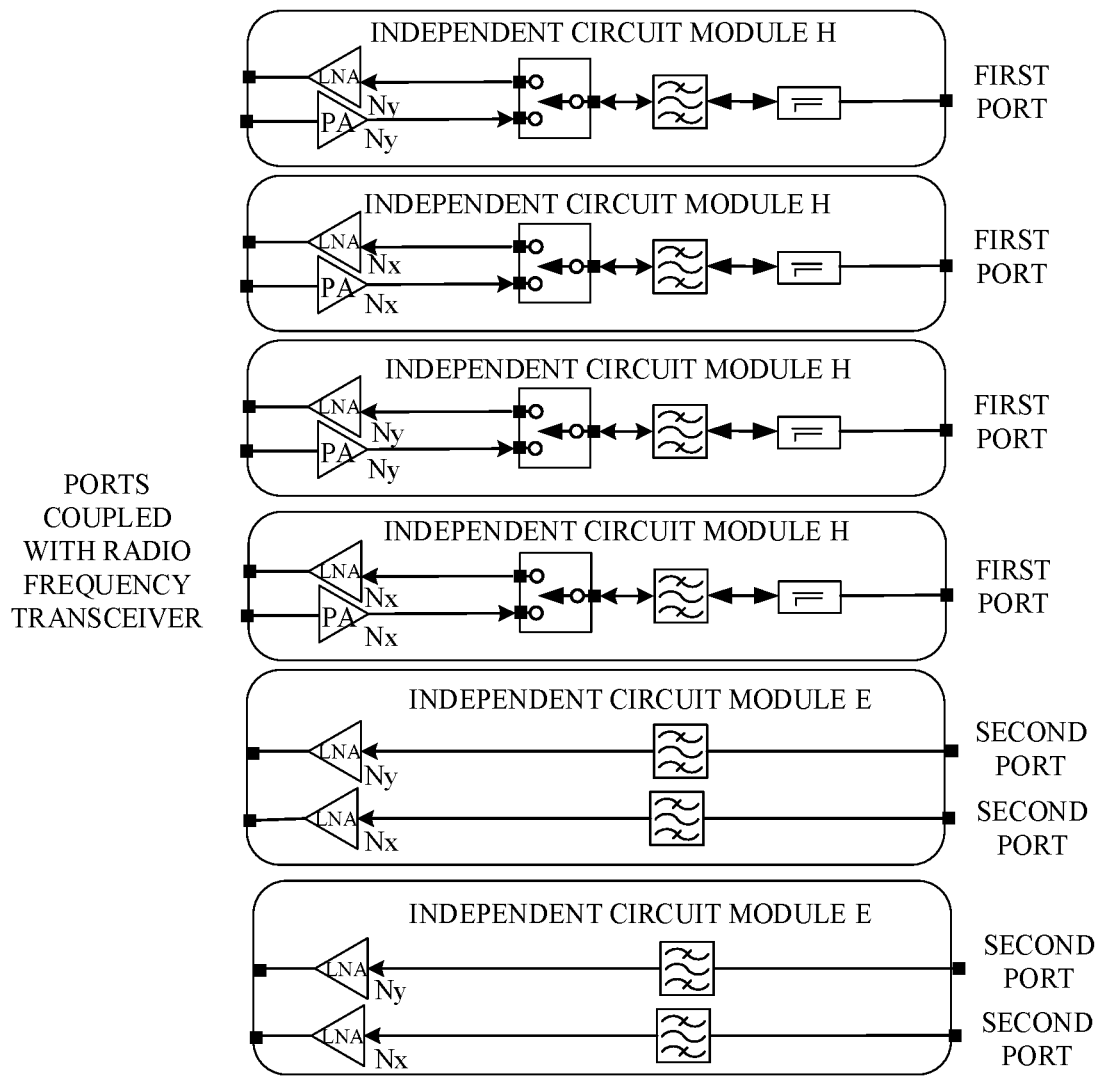
FIG. 9 is a schematic structural diagram illustrating still another radio frequency circuit according to an implementation of the disclosure.

In one implementation, as illustrated in FIG. 9 of the schematic structural diagram of the electronic device 100, the radio frequency circuit 30 physically includes six independent circuit modules. The six independent circuit modules include two first independent circuit modules and four second independent circuit modules. In this implementation, the first independent circuit module is embodied as an independent circuit module E and the second independent circuit module is embodied as an independent circuit module H. The independent circuit module E includes two second ports, and the independent circuit module H includes one first port. Each first port is coupled with one of the four first T ports, and each second port is coupled with one of the four second T ports. The independent circuit module E includes two receiver circuits. Each receiver circuit has a receive port coupled with one second port of the independent circuit module E. The independent circuit module H includes one transceiver integrated circuit. The transceiver integrated circuit includes one transmitter circuit and one receiver circuit and has a transmit-receive port coupled with the first port of the independent circuit module H. Details will be described hereinafter.

Figure 10:
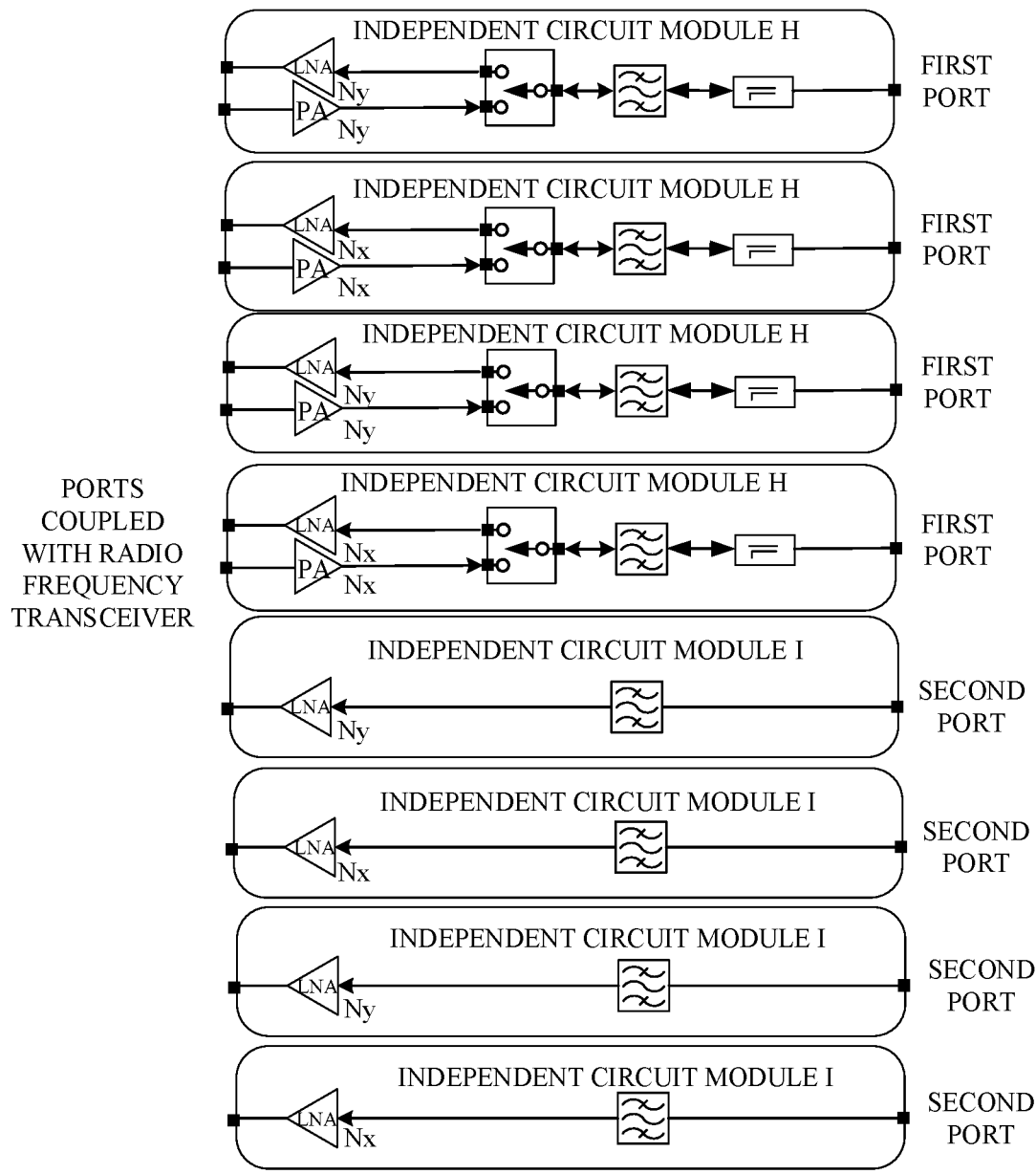
FIG. 10 is a schematic structural diagram illustrating still another radio frequency circuit according to an implementation of the disclosure.

In one implementation, as illustrated in FIG. 10 of the schematic structural diagram of the electronic device 100, the radio frequency circuit 30 physically includes eight independent circuit modules. The eight independent circuit modules include four first independent circuit modules and four second independent circuit modules. In this implementation, the first independent circuit module is embodied as an independent circuit module H and the second independent circuit module is embodied as an independent circuit module I. The independent circuit module H includes one first port, and the independent circuit module I includes one second port. Each first port is coupled with one of the four first T ports, and each second port is coupled with one of the four second T ports. The independent circuit module H includes one transceiver integrated circuit. The transceiver integrated circuit includes one transmitter circuit and one receiver circuit and has a transmit-receive port coupled with the first port of the independent circuit module H. The independent circuit module I includes one receiver circuit. The receiver circuit has a receive port coupled with the second port of the independent circuit module I. Details will be described hereinafter.

In the above implementations, the coupling manner between the four first ports and the four first T ports is one-to-one correspondence (one first port coupled with one first T port), and the coupling manner between the four second ports and the four second T ports is one-to-one correspondence. In other words, the above expression of "each first port is coupled with one of the four first T ports" means that four first ports are coupled in one-to-one correspondence with four first T ports; similarly, the above expression of "each second port is coupled with one of the four second T ports" means that four second ports are coupled in one-to-one correspondence with four second T ports.

In the above implementations, each transceiver integrated circuit is coupled with one first port of an independent circuit module to which this transceiver integrated circuit belongs. In the case that an independent circuit module includes two transceiver integrated circuits, the two transceiver integrated circuits are coupled with two first ports of the forgoing independent circuit module in one-to-one correspondence. Each receiver circuit in the above implementations is coupled with one second port of an independent circuit module to which this receiver circuit belongs. In the case that an independent circuit module includes multiple receiver circuits, the multiple receiver circuits are coupled with second ports of the forgoing independent circuit module in one-to-one correspondence.

Furthermore, since low-noise amplifiers (LNA) in the receiver circuits can operate simultaneously, due to their low power and low power consumption, mutual influence can be avoided through design. Therefore, multiple LNAs in multiple receiver circuits at the same frequency band can be disposed in the same circuit module. As can be seen, when two power amplifiers (PAs) at the same frequency band work simultaneously (corresponding to UL MIMO mode), a transmit power will be high, and two signals will interfere with each other. In addition, the two PAs will affect heat dissipation efficiency when working at the same time. Considering that the implementations of the present disclosure include four transmitter circuits, two of the four transmitter circuits at the same frequency band cannot be set in the same circuit module. Therefore, when two PAs are disposed in the same circuit module, the two PAs are at different frequency bands. That is to say, two transceiver integrated circuits at the same frequency band cannot be disposed in the same circuit module.

It can be understood that, the above-mentioned transceiver integrated circuits, receiver circuits, and transmitter circuits can be implemented in various manners. The implementations of the disclosure are not particularly restricted.

Each receiver circuit in the above implementations includes one LNA and one filter. The filter has a receive port (a receive port of a receiver circuit) coupled with a second port of an independent circuit module to which this receiver circuit belongs. The filter has an output port coupled with a receive port of the LNA. The LNA has an output port coupled with a corresponding port of the radio frequency transceiver.

Each transceiver integrated circuit in the above implementations includes one PA, one LNA, one switch, one filter, and one power coupler. The PA has a receive port coupled with a corresponding port of the radio frequency transceiver. The LNA has an output port coupled with a corresponding port of the radio frequency transceiver. The PA has an output port coupled with a first selection port of the switch. The LNA has a receive port coupled with a second selection port of the switch. The switch has a common port coupled with one port of the filter. The filter has the other one port coupled with a first port of the power coupler. The power coupler has a second port (a transmit-receive port of a transceiver integrated circuit) coupled with a first port of an independent circuit module to which this transceiver integrated circuit belongs.

The following elaborates the case where the radio frequency circuit 30 physically includes two independent circuit modules.

As illustrated in FIG. 3A, the radio frequency circuit 30 physically includes two independent circuit modules A. The independent circuit module A includes two transceiver integrated circuits and two receiver circuits. Each transmission-receiver circuit includes one transmitter circuit and one receiver circuit. The two transceiver integrated circuits of the independent circuit module A include a first transceiver integrated circuit and a second transceiver integrated circuit. The two receiver circuits of the independent circuit module A include a first receiver circuit and a second receiver circuit. The first transceiver integrated circuit includes one LNA, one PA, and one power coupler. The LNA is coupled with a "PRX_NY" pin (a fourth receive port at the NY frequency band). The PA is coupled with a "TX_CH0_NY" pin (a transmit port of a first transmit path at the NY frequency band). The power coupler is coupled with one first port of the independent circuit module A. The first port is coupled with one first T port of the multiway switch 10. The second transmission-receiver circuit includes one LNA, one PA, and one power coupler. The LNA is coupled with a "PRX_NX" pin (a fourth receive port at the NX frequency band. The PA is coupled with a "TX_CH0_NX" pin (a transmit port of a first transmit path at the NX frequency band). The power coupler is coupled with the other first port of the independent circuit module A. The first port is coupled with another one first T port of the multiway switch 10. The first receiver circuit includes one LNA and one filter. The LNA is coupled with a "RX1_NY" pin (a third receive port at the NY frequency band). The filter is coupled with one second port of the independent circuit module A. The second port is coupled with one second T port of the multiway switch 10. The second receiver circuit includes one LNA and one filter. The LNA is coupled with a "RX1_NX" pin (a third receive port at the NX frequency band). The filter is coupled with the other second port of the independent circuit module A. The second port is coupled with another one second T port of the multiway switch 10.

Figure 3B:
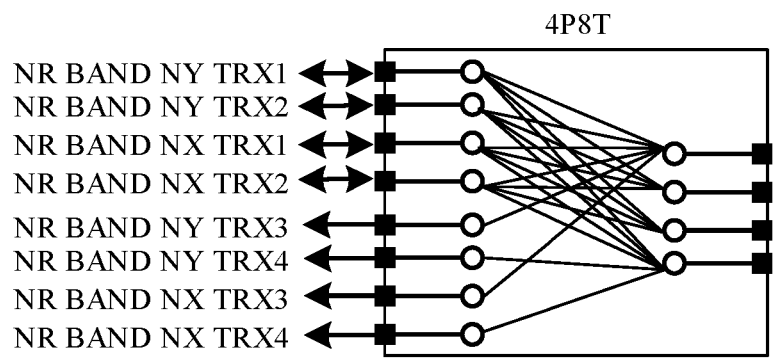
FIG. 3B is a schematic structural diagram illustrating a multiway switch according to an implementation of the disclosure.

Annotations of the multiway switch illustrated in FIG. 3B are described in detail hereinafter. "NR BAND NY TRX1" and "NR BAND NY TRX2" represent pins corresponding to two transceiver integrated circuits at the NY frequency band. "NR BAND NX TRX1" and "NR BAND NX TRX2" represent pins corresponding to two transceiver integrated circuits at the NX frequency band. "NR BAND NY RX3" and "NR BAND NY TRX4 represent pins corresponding to two receiver circuits at the NY frequency band. "NR BAND NX RX3" and "NR BAND NX TRX4 represent pins corresponding to two receiver circuits at the NX frequency band.

It can be understood that, as illustrated in FIG. 3A, the four LNAs of the other one independent circuit module A are respectively coupled with a "RX2_NY" pin (a second receive port at the NY frequency band), a "RX2_NX" pin (a second receive port at the NX frequency band), a "RX3_NY" pin (a first receive port at the NY frequency band) and a "RX3_NX" pin (a first receive port at the NX frequency band) of the radio frequency transceiver. The two PAs are respectively coupled with a "TX_CH1_NY" pin (a transmit port of a second transmit path at the NY frequency band) and a "TX_CH1_NX" pin (a transmit port of a second transmit path at the NX frequency band). The coupling manners of other circuits and the multiway switch 10 are similar to those of the first independent circuit module, and are not repeated herein.

The coupling manners of the radio frequency transceiver, the radio frequency circuit 30, and the multiway switch 10 illustrated in FIGS. 4, 5, 6, 7, 8, 9, and 10 are similar to those of the radio frequency transceiver, the radio frequency circuit 30, and the multiway switch 10 illustrated in FIG. 3A and FIG. 3B, and are not repeated herein.

In one possible implementation, the four antennas include a first antenna, a second antenna, a third antenna, and a fourth antenna. These four antennas are all operable at a fifth generation new radio (5G NR) frequency band.

The 5G NR frequency band may include, for example, 3.3 GHz to 3.8 GHz and 4.4 GHz to 5 GHz.

In one possible implementation, the four antennas include a first antenna, a second antenna, a third antenna, and a fourth antenna. The first antenna and the fourth antenna are antennas operable at a long term evolution (LTE) frequency band and a fifth generation new radio (5G NR) frequency band. The second antenna and the third antenna are antennas only operable at the 5G NR frequency band.

The first antenna and fourth antenna are intended to support DL 4×4 MIMO for some frequency bands in LTE on terminals. These two antennas are shared with the 5G NR (hereinafter, "shared antennas" for short). The LTE frequency band may include, for example, 1880-1920 MHz and 2496-2690 MHz.

Figure 11:
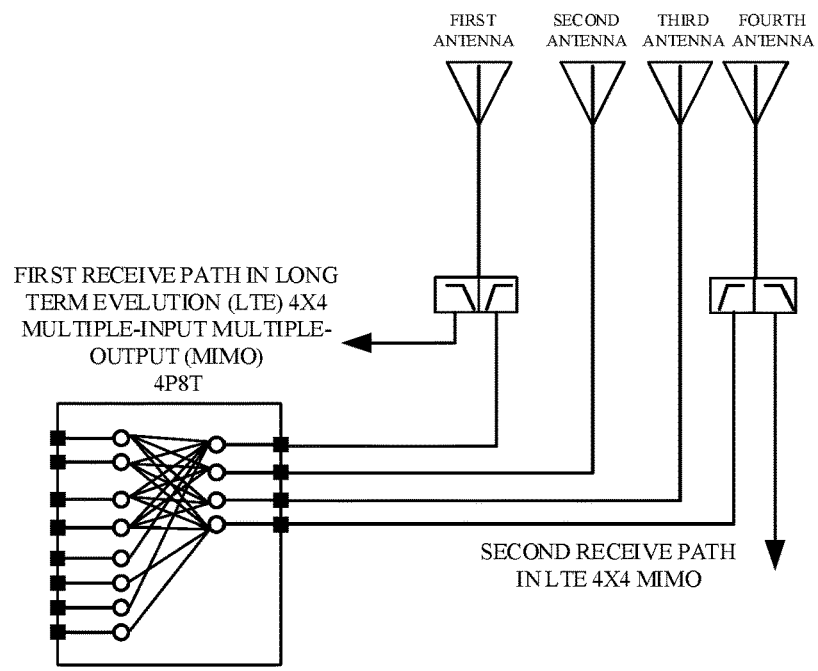
FIG. 11 is a schematic structural diagram illustrating an antenna system of an electronic device according to an implementation of the disclosure.

In one possible implementation, as illustrated in FIG. 11, the antenna system further includes a first combiner and a second combiner. The first combiner has a first port configured to be coupled with the first antenna, a second port configured to be coupled with a first receive path in LTE 4×4 multiple-input multiple-output (MIMO) configuration of the electronic device 100, and a third port configured to be coupled with a corresponding P port of the multiway switch 10. The second combiner has a first port configured to be coupled with the fourth antenna, a second port configured to be coupled with a second receive path in the LTE 4×4 MIMO configuration of the electronic device 100, and a third port configured to be coupled with a corresponding P port of the multiway switch 10.

The LTE 4*4 MIMO is a downlink LTE receive circuit and can be defined as a third receive path. Since the LTE currently has two receive paths, in order to support LTE 4×4 MIMO, the third path and a fourth receive path are added.

According to performance of the four antennas, the electronic device 100 will arrange one antenna with better performance for the circuit for PRX (primary receiver), and the antenna will be in a standby state. Moreover, first T ports of the switch having the transmission-reception function can be configured for TX (transmit) and PRX purpose, and thus the antenna can be switched arbitrarily. In this way, there is no need to restrict the coupling between ports of shared antennas.

Figure 12:
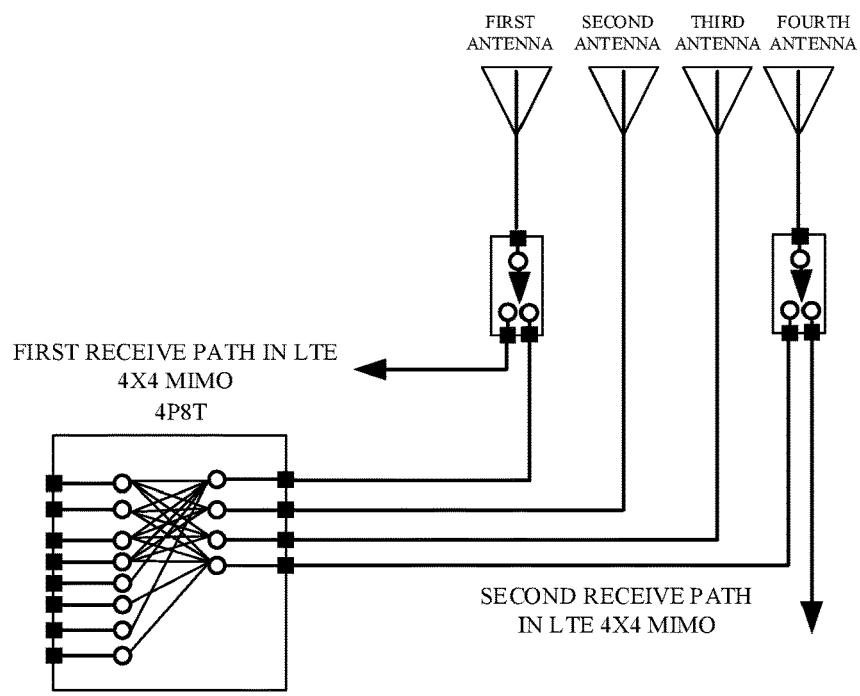
FIG. 12 is a schematic structural diagram illustrating another antenna system of an electronic device according to an implementation of the disclosure.

In one possible implementation, as illustrated in FIG. 12, the antenna system 20 further includes a first single-pole double-throw (SPDT) switch and a second SPDT switch. The first SPDT switch has a first port configured to be coupled with the first antenna, a second port configured to be coupled with a first receive path in LTE 4×4 MIMO configuration of the electronic device 100, and a third port configured to be coupled with a corresponding P port of the multiway switch 10. The second SPDT switch has a first port configured to be coupled with the fourth antenna, a second port configured to be coupled with a second receive path in the LTE 4×4 MIMO configuration of the electronic device 100, and a third port configured to be coupled with a corresponding P port of the multiway switch 10.

The schemes of the disclosure can be combined or replaced with each other. For example, the antenna system and/or the multiway switch described above can be applied or combined into the radio frequency system and the terminal device below. It is to be noted that, "the antenna system and/or the multiway switch" of the disclosure means "the antenna system", "the multiway switch", or "the antenna system and the multiway switch".

Figure 13:
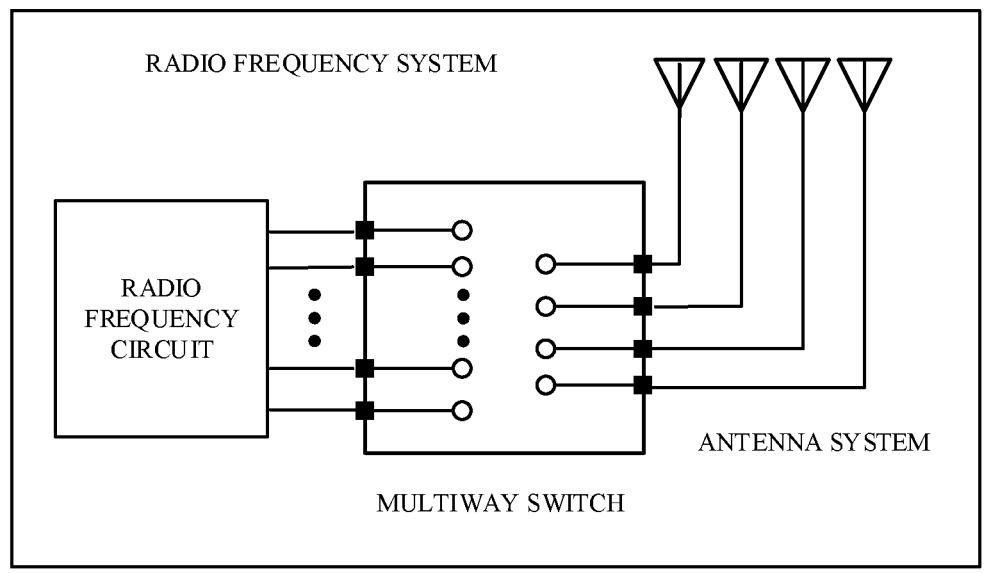
FIG. 13 is a schematic structural diagram illustrating a radio frequency system according to an implementation of the disclosure.

FIG. 13 is a schematic structural diagram illustrating a radio frequency system according to an implementation of the disclosure. The radio frequency system includes an antenna system, a radio frequency circuit, and a multiway switch coupled with the radio frequency circuit and the antenna system. The multiway switch includes eight T ports and four P ports. The eight T ports includes four first T ports and each of the four first T ports is coupled with all of the four P ports. The four first T ports support a transmission-reception function. The antenna system includes four antennas corresponding to the four P ports. The multiway switch is configured to implement a preset function of transmitting an SRS through the four antennas in turn.

As one implementation, the eight T ports further include four second T ports. Two of the four second T ports at different frequency bands are coupled with one of the four P ports. The other two of the four second T ports at different frequency bands are coupled with another one of the four P ports. Each of the four P ports is configured to be coupled with a corresponding antenna of the four antennas. The four second T ports support only a reception function.

As one implementation, the four antennas include a first antenna, a second antenna, a third antenna, and a fourth antenna. The first antenna and the fourth antenna are antennas operable at an LTE frequency band and a 5G NR frequency band. The second antenna and the third antenna are antennas only operable at the 5G NR frequency band.

As one implementation, with the above structure regarding to the four antennas, the antenna system further includes a first combiner and a second combiner. The first combiner has a first port coupled with the first antenna, a second port coupled with a first receive path in LTE 4×4 MIMO configuration of the electronic device, and a third port coupled with a corresponding P port of the multiway switch. The second combiner has a first port coupled with the fourth antenna, a second port coupled with a second receive path in the LTE 4×4 MIMO configuration of the electronic device, and a third port coupled with a corresponding P port of the multiway switch.

As one implementation, with the above structure regarding to the four antennas, the antenna system 20 further includes a first single-pole double-throw (SPDT) switch and a second SPDT switch. The first SPDT switch has a first port coupled with the first antenna, a second port coupled with a first receive path in LTE 4×4 multiple-input multiple-output (MIMO) of the electronic device 100, and a third port coupled with a corresponding P port of the multiway switch. The second SPDT switch has a first port coupled with the fourth antenna, a second port coupled with a second receive path in the LTE 4×4 MIMO of the electronic device 100, and a third port coupled with a corresponding P port of the multiway switch.

The definitions related to the radio frequency system illustrated in FIG. 13 are similar to the foregoing descriptions and are not described herein.

As can be seen, for the transmit paths and the receive paths of the radio frequency system of the electronic device, the transmit paths can include one single independent switch (a 4P8T switch) or two independent switches (a SPDT switch and a 4P8T switch), and the receive paths can include one single independent switch (a 4P8T switch) or two independent switches (a SPDT switch and a 4P8T switch). That is to say, by integrating more switch functions of the transmit paths and the receive paths of the radio frequency system into the 4P8T switch, the number of independent switches of the transmit paths and the receive paths can be effectively reduced.

Figure 14:
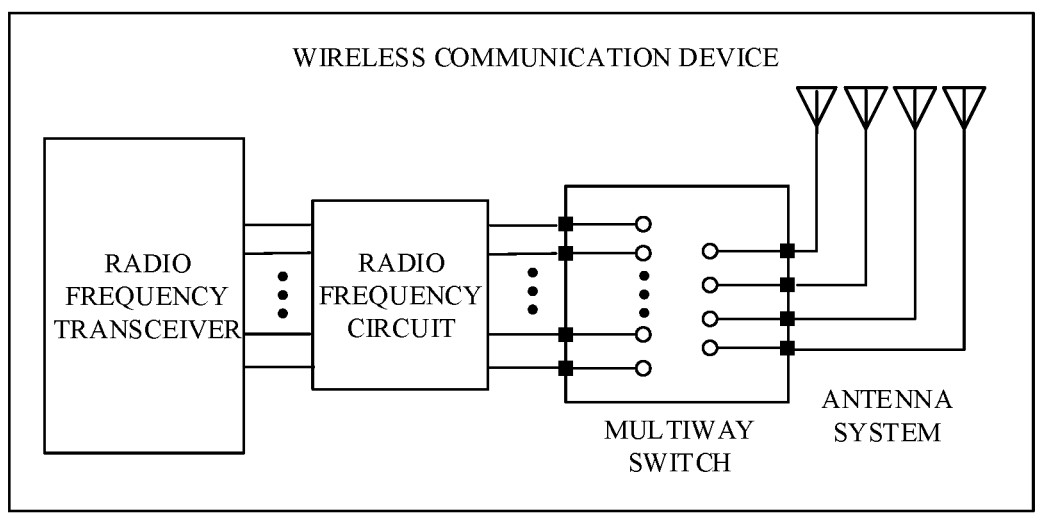
FIG. 14 is a schematic structural diagram illustrating a wireless communication device according to an implementation of the disclosure.

FIG. 14 is a schematic structural diagram illustrating a wireless communication device according to an implementation of the disclosure. The wireless communication device for example can be a terminal device, a base station, and the like and includes an antenna system, a radio frequency transceiver, a radio frequency circuit coupled with the radio frequency transceiver, and the multiway switch described in any of the implementations above.

The multiway switch includes eight T ports and four P ports. The antenna system includes four antennas corresponding to the four P ports. The eight T ports include four first T ports and four second T ports. Each of the four first T ports is coupled with all of the four P ports. The four first T ports support a transmission-reception function. Two of the four second T ports at different frequency bands are coupled with one of the four P ports. The other two of the four second T ports at different frequency bands are coupled with another one of the four P ports. The four second T ports support only a reception function. Each of the four P ports is configured to be coupled with a corresponding antenna of the four antennas.

The multiway switch is coupled with the radio frequency circuit and the antenna system and supports a preset function of transmitting an SRS through the four antennas in turn.

Figure 15:
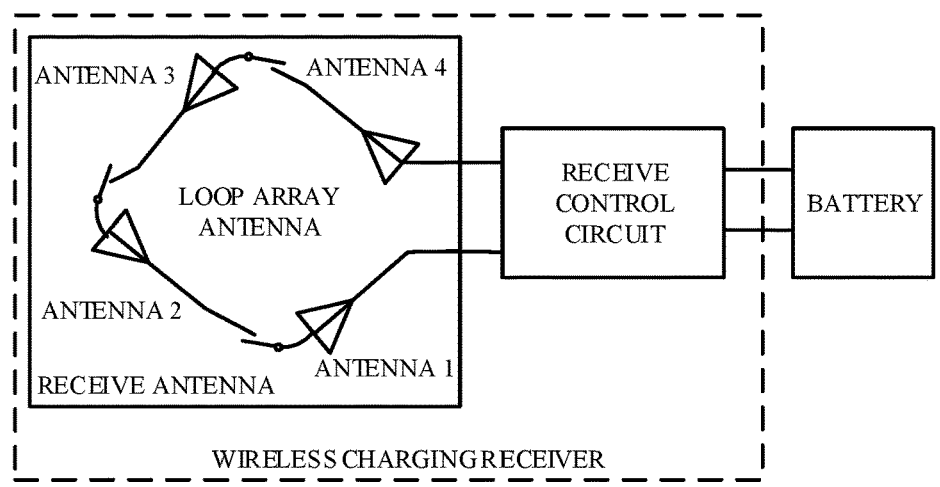
FIG. 15 is a schematic diagram illustrating a wireless charging receiver for multiplexing an antenna of a wireless communication device according to an implementation of the disclosure.

In addition, as illustrated in FIG. 15, the four antennas in the antenna system described in the implementations of the disclosure can also be multiplexed by a wireless charging receiver of the electronic device 100. The wireless charging receiver includes a receive antenna and a receive control circuit. The receive antenna matches transmit antennas of a wireless charging transmitter (resonates at the same or similar frequency and transfers energy in a wireless manner in the way of radiative resonant magnetic coupling). The receive control circuit converts, through a loop array antenna, the energy into a direct current (DC) to output to charge a battery. The receive control circuit can dynamically adjust a frequency of the loop array antenna and match the frequency of the loop array antenna with frequencies of the transmit antennas of the wireless charging transmitter to achieve paired charging. Alternatively, the receive control circuit interacts with the wireless charging transmitter in real time on a frequency change range to implement an "exclusive encryption" wireless charging mode.

The receive antenna may be an antenna include at least one of the four antennas (in the case of multiple antennas, the multiple antennas are strobed via switches).

Figure 16:
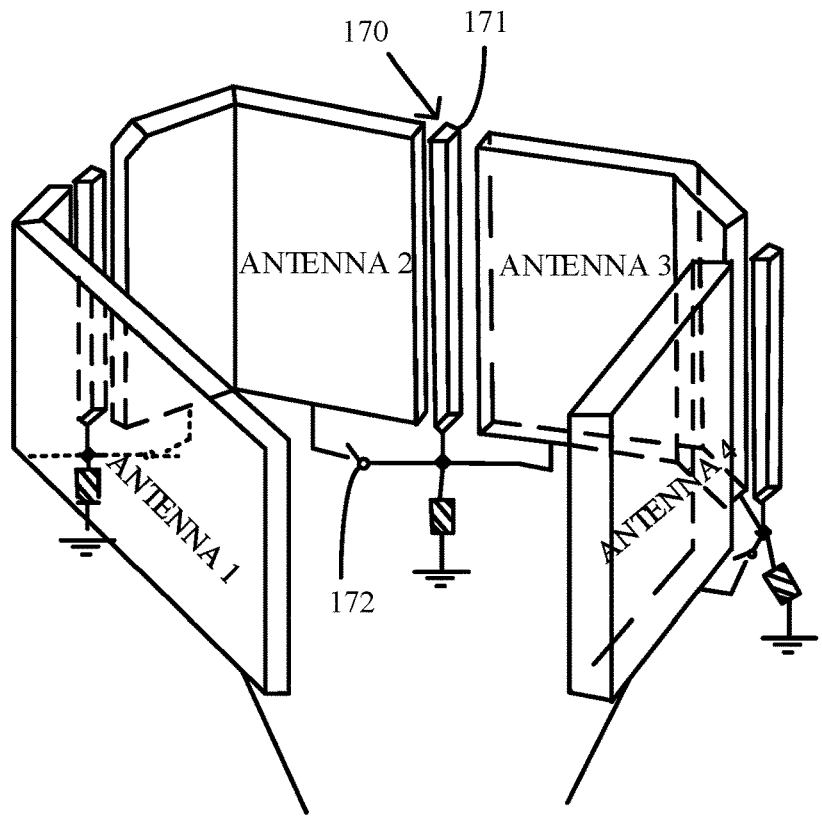
FIG. 16 is a schematic structural diagram illustrating a loop array antenna including four antennas according to an implementation of the disclosure.

For example, as illustrated in FIG. 16, the receive antenna is a loop array antenna including the four antennas described above. The four antennas include antenna 1, antenna 2, antenna 3, and antenna 4. Antenna 1 and antenna 4 are operable at both an LTE frequency band and a 5G NR frequency band, while antenna 2 and antenna 3 are only operable at the 5G NR frequency band. A port of antenna 1 and a port of antenna 4 are used as ports of the loop array antenna. Adjacent antennas are coupled via a gate circuit 170 with an isolation function. The gate circuit 170 includes a spacer 171 and a switch 172, where the spacer 171 is a conductor and the switch 172 is further coupled with a controller. The electronic device 100 can conduct the switch 172 of each gate circuit 170 in a wireless charging mode to form a loop array antenna to receive energy. By adding the spacers 171 among the antennas, the gate circuit 170 can reduce mutual coupling among the multiple antennas of the electronic device 100 in a normal communication mode, improve isolation among the multiple antennas, and optimize performance of the antennas. On the other hand, the multiple antennas can be coupled in series to form the loop array antenna through the switches 172, so as to better match the transmit antennas to transfer energy. Furthermore, since antenna 1 and antenna 4 have capabilities stronger than that of antenna 2 and antenna 3, the loop array antenna thus arranged can reduce energy loss in transmission as much as possible.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A multiway switch configured to be coupled with a radio frequency circuit and an antenna system, the multiway switch comprising:
   eight T ports and four P ports, and the antenna system comprising four antennas corresponding to the four P ports;
   the eight T ports comprising four first T ports and four second T ports;
   each of the four first T ports being coupled with all of the four P ports, and the four first T ports supporting a transmission-reception function;
   two of the four second T ports at different frequency bands being coupled with one of the four P ports, the other two of the four second T ports at different frequency bands being coupled with another one of the four P ports, and the four second T ports supporting only a reception function;
   each of the four P ports being configured to be coupled with a corresponding antenna of the four antennas; and
   the multiway switch being configured to support a preset function of transmitting a sounding reference signal (SRS) through the four antennas in turn.

2. The multiway switch of claim 1, wherein:
   the radio frequency circuit physically comprises two independent circuit modules;
   the two independent circuit modules comprise two first independent circuit modules;
   each first independent circuit module comprises two first ports and two second ports;
   each first port of each first independent circuit module is coupled with one of the four first T ports; and
   each first port of each first independent circuit module is coupled with one of the four second T ports.

3. The multiway switch of claim 2, wherein each first independent circuit module comprises two transceiver integrated circuits and two receiver circuits, wherein:
   the two transceiver integrated circuits work at different frequency bands;
   each transceiver integrated circuit comprises one transmitter circuit and one receiver circuit;
   each transceiver integrated circuit has a transmit-receive port coupled with one of the two first ports of each first independent circuit module; and
   each receiver circuit has a receive port coupled with one of the two second ports of each first independent circuit module.

4. The multiway switch of claim 1, wherein:
   the radio frequency circuit physically comprises three independent circuit modules;
   the three independent circuit modules comprise two first independent circuit modules and one second independent circuit module;
   each first independent circuit module comprises two first ports;
   the second independent circuit module comprises four second ports;
   each first port of each first independent circuit module is coupled with one of the four first T ports; and
   each second port of the second independent circuit module is coupled with one of the four second T ports.

5. The multiway switch of claim 4, wherein:
   each first independent circuit module comprises two transceiver integrated circuits, wherein
      the two transceiver integrated circuits work at different frequency bands;
      each transceiver integrated circuit comprises one transmitter circuit and one receiver circuit; and
      each transceiver integrated circuit has a transmit-receive port coupled with one of the two first ports of the second independent circuit module; and
   the second independent circuit module comprises four receiver circuits, wherein each receiver circuit has a receive port coupled with one of the four second ports of the third independent circuit module.

6. The multiway switch of claim 1, wherein:
   the radio frequency circuit physically comprises three independent circuit modules;
   the three independent circuit modules comprise two first independent circuit modules and one second independent circuit module;
   each first independent circuit module comprises two first ports and one second port;
   the second independent circuit module comprises two second ports;

each first port of each first independent circuit module is coupled with one of the four first T ports; and the second port of each first independent circuit module is coupled with one of the four second T ports and each second port of the second independent circuit module is coupled with another one of the four second T ports.

7. The multiway switch of claim 6, wherein:

each first independent circuit module comprises two transceiver integrated circuits and one receiver circuit, wherein the two transceiver integrated circuits work at different frequency bands;

each transceiver integrated circuit comprises one transmitter circuit and one receiver circuit;

each transceiver integrated circuit has a transmit-receive port coupled with one of the two first ports of the fourth independent circuit module; and the receiver circuit has a receive port coupled with the second port of the fourth independent circuit module; and the second independent circuit module comprises two receiver circuits, wherein each receiver circuit has a receive port coupled with one of the two second ports of the fifth independent circuit module.

8. The multiway switch of claim 1, wherein:

the radio frequency circuit physically comprises four independent circuit modules;

the four independent circuit modules comprise four first independent circuit modules;

each first independent circuit module comprises one first port and one second port;

the first port of each first independent circuit module is coupled with one of the four first T ports; and the second port of each first independent circuit module is coupled with one of the four second T ports.

9. The multiway switch of claim 8, wherein each first independent circuit module comprises one transceiver integrated circuit and one receiver circuit, wherein:

the transceiver integrated circuit comprises one transmitter circuit and one receiver circuit;

the transceiver integrated circuit has a transmit-receive port coupled with the first port of the sixth independent circuit module; and the receiver circuit has a receive port coupled with the second port of the sixth independent circuit module.

10. The multiway switch of claim 1, wherein:

the radio frequency circuit physically comprises four independent circuit modules;

the four independent circuit modules comprise two first independent circuit modules and two second independent circuit modules;

each first independent circuit module comprises one first port and two second ports;

each second independent circuit module comprises one first port;

the first port of each first independent circuit module is coupled with one of the four first T ports and the first port of each second independent circuit module is coupled with another one of the four first T ports; and each second port of each first independent circuit module is coupled with one of the four second T ports.

11. The multiway switch of claim 10, wherein:

each first independent circuit module comprises one transceiver integrated circuit and two receiver circuits, wherein the transceiver integrated circuit comprises one transmitter circuit and one receiver circuit;

the transceiver integrated circuit has a transmit-receive port coupled with the first port of the seventh independent circuit module; and each receiver circuit has a receive port coupled with one of the two second ports of the seventh independent circuit module; and each second independent circuit module comprises one transceiver integrated circuit, wherein the transceiver integrated circuit comprises one transmitter circuit and one receiver circuit; and the transceiver integrated circuit has a transmit-receive port coupled with the first port of the eighth independent circuit module.

12. The multiway switch of claim 1, wherein:

the radio frequency circuit physically comprises five independent circuit modules;

the five independent circuit modules comprise one first independent circuit module and four second independent circuit modules;

the first independent circuit module comprises four second ports;

each second independent circuit module comprises one first port;

the first port of each second independent circuit module is coupled with one of the four first T ports; and each second port of the first independent circuit module is coupled with one of the four second T ports.

13. The multiway switch of claim 12, wherein:

the first independent circuit module comprises four receiver circuits, wherein each receiver circuit has a receive port coupled with one of the four second ports of the third independent circuit module; and each second independent circuit module comprises one transceiver integrated circuit, wherein the transceiver integrated circuit comprises one transmitter circuit and one receiver circuit; and the transceiver integrated circuit has a transmit-receive port coupled with the first port of the eighth independent circuit module.

14. The multiway switch of claim 1, wherein:

the radio frequency circuit physically comprises six independent circuit modules;

the six independent circuit modules comprise two first independent circuit modules and four second independent circuit modules;

each first independent circuit module comprises two second ports;

each second independent circuit module comprises one first port;

the first port of each second independent circuit module is coupled with one of the four first T ports; and each second port of each first independent circuit module is coupled with one of the four second T ports.

15. The multiway switch of claim 14, wherein:

each first independent circuit module comprises two receiver circuits, wherein each receiver circuit has a receive port coupled with one of the two second ports of the fifth independent circuit module; and each second independent circuit module comprises one transceiver integrated circuit, wherein the transceiver integrated circuit comprises one transmitter circuit and one receiver circuit; and the transceiver integrated circuit has a transmit-receive port coupled with the first port of the eighth independent circuit module.

16. The multiway switch of claim 1, wherein:
the radio frequency circuit physically comprises eight independent circuit modules;
the eight independent circuit modules comprise four first independent circuit modules and four second independent circuit modules;
each first independent circuit module comprises one first port;
each second independent circuit module comprises one second port;
the first port of each first independent circuit module is coupled with one of the four first T ports; and
the second port of each second independent circuit module is coupled with one of the four second T ports.

17. The multiway switch of claim 16, wherein:
each first independent circuit module comprises one transceiver integrated circuit, wherein
the transceiver integrated circuit comprises one transmitter circuit and one receiver circuit; and
the transceiver integrated circuit has a transmit-receive port coupled with the first port of the eighth independent circuit module; and
each second independent circuit module comprises one receiver circuit, wherein
the receiver circuit has a receive port coupled with the second port of the ninth independent circuit module.

18. A radio frequency system, comprising:
an antenna system, a radio frequency circuit, and a multiway switch coupled with the radio frequency circuit and the antenna system;
the multiway switch comprising eight T ports and four P ports, and the antenna system comprising four antennas corresponding to the four P ports;
the eight T ports comprising four first T ports and four second T ports;
each of the four first T ports being coupled with all of the four P ports, and the four first T ports supporting a transmission-reception function;
two of the four second T ports at different frequency bands being coupled with one of the four P ports, the other two of the four second T ports at different frequency bands being coupled with another one of the four P ports, and the four second T ports supporting only a reception function;
each of the four P ports being configured to be coupled with a corresponding antenna of the four antennas; and
the multiway switch being configured to support a preset function of transmitting a sounding reference signal (SRS) through the four antennas in turn.

19. A wireless communication device, comprising:
an antenna system, a radio frequency transceiver, a radio frequency circuit coupled with the radio frequency transceiver, and a multiway switch coupled with the radio frequency circuit and the antenna system;
the multiway switch comprising eight T ports and four P ports, and the antenna system comprising four antennas corresponding to the four P ports;
the eight T ports comprising four first T ports and four second T ports;
each of the four first T ports being coupled with all of the four P ports, and the four first T ports supporting a transmission-reception function;
two of the four second T ports at different frequency bands being coupled with one of the four P ports, the other two of the four second T ports at different frequency bands being coupled with another one of the four P ports, and the four second T ports supporting only a reception function;
each of the four P ports being configured to be coupled with a corresponding antenna of the four antennas; and
the multiway switch being configured to support a preset function of transmitting a sounding reference signal (SRS) through the four antennas in turn.

\* \* \* \* \*